(12) United States Patent
Lyons

(10) Patent No.: US 6,195,104 B1
(45) Date of Patent: *Feb. 27, 2001

(54) SYSTEM AND METHOD FOR PERMITTING THREE-DIMENSIONAL NAVIGATION THROUGH A VIRTUAL REALITY ENVIRONMENT USING CAMERA-BASED GESTURE INPUTS

(75) Inventor: Damian M. Lyons, Putnam Valley, NY (US)

(73) Assignee: Philips Electronics North America Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/996,677

(22) Filed: Dec. 23, 1997

(51) Int. Cl.[7] .................................................... G06F 15/00
(52) U.S. Cl. ............................................................ 345/473
(58) Field of Search .................................. 345/419, 420, 345/427, 433, 473, 475, 474

(56) References Cited

U.S. PATENT DOCUMENTS 6,014,472 * 1/2000 Minami et al. ...................... 345/426

FOREIGN PATENT DOCUMENTS 07038873A 2/1995 (JP) .
WO9621321 7/1996 (WO) .

* cited by examiner

Primary Examiner—Phu K. Nguyen
(74) Attorney, Agent, or Firm—Gregory L. Thorne

(57) ABSTRACT

A system and method for constructing three-dimensional images using camera-based gesture inputs of a system user. The system comprises a computer-readable memory, a video camera for generating video signals indicative of the gestures of the system user and an interaction area surrounding the system user, and a video image display. The video image display is positioned in front of the system users. The system further comprises a microprocessor for processing the video signals, in accordance with a program stored in the computer-readable memory, to determine the three-dimensional positions of the body and principle body parts of the system user. The microprocessor constructs three-dimensional images of the system user and interaction area on the video image display based upon the three-dimensional positions of the body and principle body parts of the system user. The video image display shows three-dimensional graphical objects superimposed to appear as if they occupy the interaction area, and movement by the system user causes apparent movement of the superimposed, three-dimensional objects displayed on the video image display.

20 Claims, 8 Drawing Sheets

SYSTEM AND METHOD FOR PERMITTING THREE-DIMENSIONAL NAVIGATION THROUGH A VIRTUAL REALITY ENVIRONMENT USING CAMERA-BASED GESTURE INPUTS

BACKGROUND OF THE INVENTION

A. Field of the Invention

The present invention relates generally to multimedia and virtual reality applications, and, more particularly to a system and method for constructing three-dimensional images using camera-based gesture inputs.

B. Description of the Related Art

Multimedia and virtual reality applications permit exciting interaction between a user and a computer. Unfortunately, current computer/user interfaces present a barrier to simplistic user interactivity and thus, consumer acceptance of multimedia and virtual reality applications. Ideally, computer/user interfaces would combine an intuitive interaction format with a broad range of interaction capabilities. Practically, however, these two features conflict. For example, a computer keyboard offers broad interaction capabilities but is not intuitive, whereas a television remote control is more intuitive but offers limited interaction capabilities. Even more flexible interfaces, such as an instrumented body suit, can be both cumbersome and expensive.

A number of approaches to computer/user interface design have been suggested. One approach uses a video camera in a non-invasive way to measure the gestures of a system user, so to control the images displayed to the system user. As shown in FIG. 1, such an interface system 10 comprises a blue wall 12 in which a user 14 stands in front of, permitting two-dimensional silhouette extraction of user 14 and chromakeying of the silhouette. System 10 further includes a video camera 16 for identifying the two-dimensional, user silhouette and for producing a video signal. A microprocessor 18 of a computer identifies the two-dimensional, user silhouette seen by video camera 16, but only as a two-dimensional shape. Thus, motions of user 14 are only understood by microprocessor 18 in terms of the changing image coordinates of the silhouette. Microprocessor 18 displays an image of user 14 on a television display 20. The image displayed on television 20 consists of a two-dimensional scene into which the user's image has been chromakeyed. User 14 can interact with the displayed scene by adopting a specific pose, e.g., hands-over-head, or by moving so that a portion of the user's silhouette touches a designated set of image coordinates making it appear as if user 14 touched a displayed object.

The interface system shown in FIG. 1 provides an easy-to-use, inexpensive interface with multimedia and virtual reality applications. However, the interface system only permits two-dimensional interaction with computer-displayed objects, restricting the capabilities of the interface to two dimensions. For example, in the two-dimensional system of FIG. 1, all of the computer-displayed objects are at the same depth in the window surrounding the user's silhouette.

As seen in FIG. 2, a conventional two-dimensional silhouette extraction process used by the system shown in FIG. 1, comprises both a hardware process (above the dashed line) and a software process (below the dashed line), wherein computer microprocessor 18 performs the software process steps. The hardware process involves a step 22 of inputting an analog video camera signal, followed by a step 24 of digitizing the analog camera signal to produce a gray-scale binary data signal. The hardware process further comprises a step 26 of adjusting the resolution (high or low) of the video camera, and a step 28 of restricting the camera view to a window of the image of interest, i.e., the user's image. The hardware process next comprises a dynamic threshold step 30 where the gray-scale binary data signal is converted into digital binary data, e.g., "1" or "0". At step 32, the hardware process determines the edges (silhouette) of the user's image, and, based on the edge data, adjusts the picture size (step 34) so to adjust the resolution accordingly at step 26.

The software process involves a first step 36 of subtracting the background from the edge data of step 34, leaving only an image contour of the user's image. The background is a picture of an empty scene as seen by the camera, and is provided at step 38. The software further comprises a step of joining together all of the edge data of the user's image, providing a single contour around the user's image. The software process also comprises an identification step 42 for determining whether the user image contour represents a person, an animal, etc., and a silhouette feature step 44 for identifying the silhouette features (in x, y coordinates) of the user, e.g., head, hands, feet, arms, legs, etc. At step 46, the software process utilizes the contour identification data in order to calculate a bounding box around the user. The bounding box data is provided to the window restricting step 28 for restricting the size of the camera window around the user, and thus, increase the speed of the extraction process.

An alternative approach, proposed by the Media Lab at the Massachusetts Institute of Technology ("MIT"), allows a user to interact with a computer-generated graphical world by using camera-based body motions and gestures of a system user. Such a system, while being amongst the most versatile of its kind currently available, suffers from the following problems:

(1) it is based on a standard graphical interface ("SGI") platform; (2) it is sensitive to lighting conditions around the system user; (3) although it tracks the user's foot position in three dimensions, it treats the remainder of the user's body as a two-dimensional object; (4) it is limited to a single user; (5) it provides too coarse of resolution to see user hand details such as fingers; and (6) it is tied to only the "magic mirror" interactive video environment ("IVE") paradigm, described below. Thus, the alternative approach suffers from the same limitations encountered by the conventional two-dimensional approach, as well as many other problems.

Still another approach includes a method for real-time recognition of a human image, as disclosed Japanese Patent Abstract Publication No. 07-038873 ("JP 07-038873"). JP 07-038873 describes three-dimensional graphical generation of a person that detects the expression, rotation of the head, motion of the fingers, and rotation of the human body. However, JP 07-038873 is limited to graphical model generation of the human body. Furthermore, JP 07-38873 focuses on using three-dimensional graphical animation of a user primarily for teleconferencing purposes, wherein the user cannot control objects in a computer-generated scene. Finally, the reference discloses using three-dimensional animation of a remote user for teleconferencing purposes, as opposed to a three-dimensional animation of a local user.

A final approach, as found in International Patent Application (PCT) WO 96/21321 ("PCT 96/21321"), consists of creating a three-dimensional simulation of an event (e.g., a football game), in real-time or storing it on a CD ROM, using cameras and microphones. The system disclosed in PCT 96/21321, however, merely replays three-dimensional scenes of the event as they are viewed by the cameras. Furthermore, users of the PCT 96/21321 system can only change their perspective of the three-dimensional scenes and are unable to control objects in the scenes.

Unfortunately, none of these proposed approaches described above provides a computer/user interface that combines an intuitive interaction format with a broad range of interaction capabilities.

SUMMARY OF THE INVENTION

An object of the present invention is to address the problems encountered by the two-dimensional interface systems and the alternative approaches proposed by the Media Lab at the Massachusetts Institute of Technology and the other related art discussed above.

Another object is to provide a three-dimensional display of computer-generated objects so that the objects occupy the three-dimensional space around the computer users and the computer users can interact with and control the objects through normal body movements.

A final object is to provide multimedia and virtual reality applications which three-dimensionally displayed computer users can interact and control through normal body movements.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a system for constructing three-dimensional images using camera-based gesture inputs of a user of the system, including: a computer-readable memory means; means for generating video signals indicative of the gestures of the system user and an interaction area surrounding the system user; means for displaying video images, the video image display means being positioned in front of the system user; and means for processing the video signals, in accordance with a program stored in the computer-readable memory means, to determine the three-dimensional positions of the body and principle body parts of the system user, wherein the video signal processing means constructs three-dimensional images of the system user and interaction area on the video image display means based upon the three-dimensional positions of the body and principle body parts of the system user, the video image display means displays three-dimensional graphical objects superimposed to appear as if they occupy the interaction area, and movement by the system user causes apparent movement of the superimposed, three-dimensional objects displayed on the video image display means.

To further achieve the objects, the present invention comprises a method for constructing three-dimensional images using camera-based gesture inputs of a user of a computer system having a computer-readable memory and video image display connected to a microprocessor using a program stored in the computer-readable memory, the method comprising the steps of: generating video signals indicative of the gestures of the system user and an interaction area surrounding the system user; processing the video signals in the microprocessor to determine the three-dimensional positions of the body and principle body parts of the system user; using the microprocessor to construct three-dimensional images of the system user and interaction area on the video image display based upon the three-dimensional positions of the body and principle body parts of the system user; and utilizing the microprocessor to display on the video image display three-dimensional graphical objects superimposed to appear as if they occupied the interaction area, wherein movement by the system user causes apparent movement by the superimposed, three-dimensional objects displayed on the video image display.

To still further achieve the objects, the present invention comprises a computer-readable memory device for storing a program that constructs three-dimensional images using camera-based gesture inputs of a user of a computer system having a video image display connected to a microprocessor using instructions stored in the computer-readable memory device, the computer-readable memory device comprising: instructions for processing video signals indicative of gestures of the system user to determine the three-dimensional positions of the body and principle body parts of the system user; instructions for constructing three-dimensional images of the system user and interaction area on the video image display based upon the three-dimensional positions of the body and principle body parts of the system user; and instructions for displaying, on the video image display, three-dimensional graphical objects superimposed to appear as if they occupied the interaction area, wherein movement by the system user causes apparent movement by the superimposed, three-dimensional objects displayed on the video image display.

To even further achieve the objects, the present invention comprises a computer program product for constructing three-dimensional images using camera-based gesture inputs of a user of a computer system having a video image display connected to a microprocessor, the computer program product comprising: means for processing video signals indicative of gestures of the system user to determine the three-dimensional positions of the body and principle body parts of the system user; means for constructing three-dimensional images of the system user and interaction area on the video image display based upon the three-dimensional positions of the body and principle body parts of the system user; and means for displaying, on the video image display, three-dimensional graphical objects superimposed to appear as if they occupied the interaction area, wherein movement by the system user causes apparent movement by the superimposed, three-dimensional objects displayed on the video image display.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

In accordance with the preferred embodiments, the present invention includes a system and method for constructing three-dimensional images using camera-based gesture inputs of system users. The system comprises a computer-readable memory means, means for generating video signals indicative of the gestures of the system users and an interaction area surrounding the system users, and means for displaying video images. The video image display means is positioned in front of the system users. The system further comprises means for processing the video signals, in accordance with a program stored in the computer-readable memory means, to determine the three-dimensional positions of the bodies and principle body parts of the system users, wherein the video signal processing means constructs three-dimensional images of the system users and interaction area on the video image display means based upon the three-dimensional positions of the bodies and principle body parts of the system users, the video image display means displays three-dimensional graphical objects superimposed to appear as if they occupy the interaction area, and movement by the system users causes apparent movement of the superimposed, three-dimensional objects displayed on the video image display means.

In other words, the present invention is drawn to a natural and intuitive computer/user interface based upon computer vision interaction by system users. As used herein, "computer vision" is the use of a computer to interpret information received from a video imaging device in terms of what objects the imaging device sees. Computer vision permits recognition of user gestures, body motions, head motions, eye motions, etc. The recognized user motions, in turn, are used to interact with multimedia and virtual reality applications. Specifically, the present invention takes the system users' silhouettes in two-dimensional image coordinates and projects them into the three-dimensional image coordinates the system users occupy in the interaction area.

Such an approach is undemanding upon the system users and inexpensive to make. If the system users are interacting via a large-screen display, the computer knows where the system users are looking and pointing, etc., and manipulates the information on the display accordingly. Further, the position and pose of the system users in front of the display screen are extracted and used for interaction with a three-dimensional graphical model. The addition of gesture interpretation to the computer vision system of the present invention adds realism to the interaction with the computer. For example, intuitive hand gestures may be used as an interface with the computer system.

Figure 3:
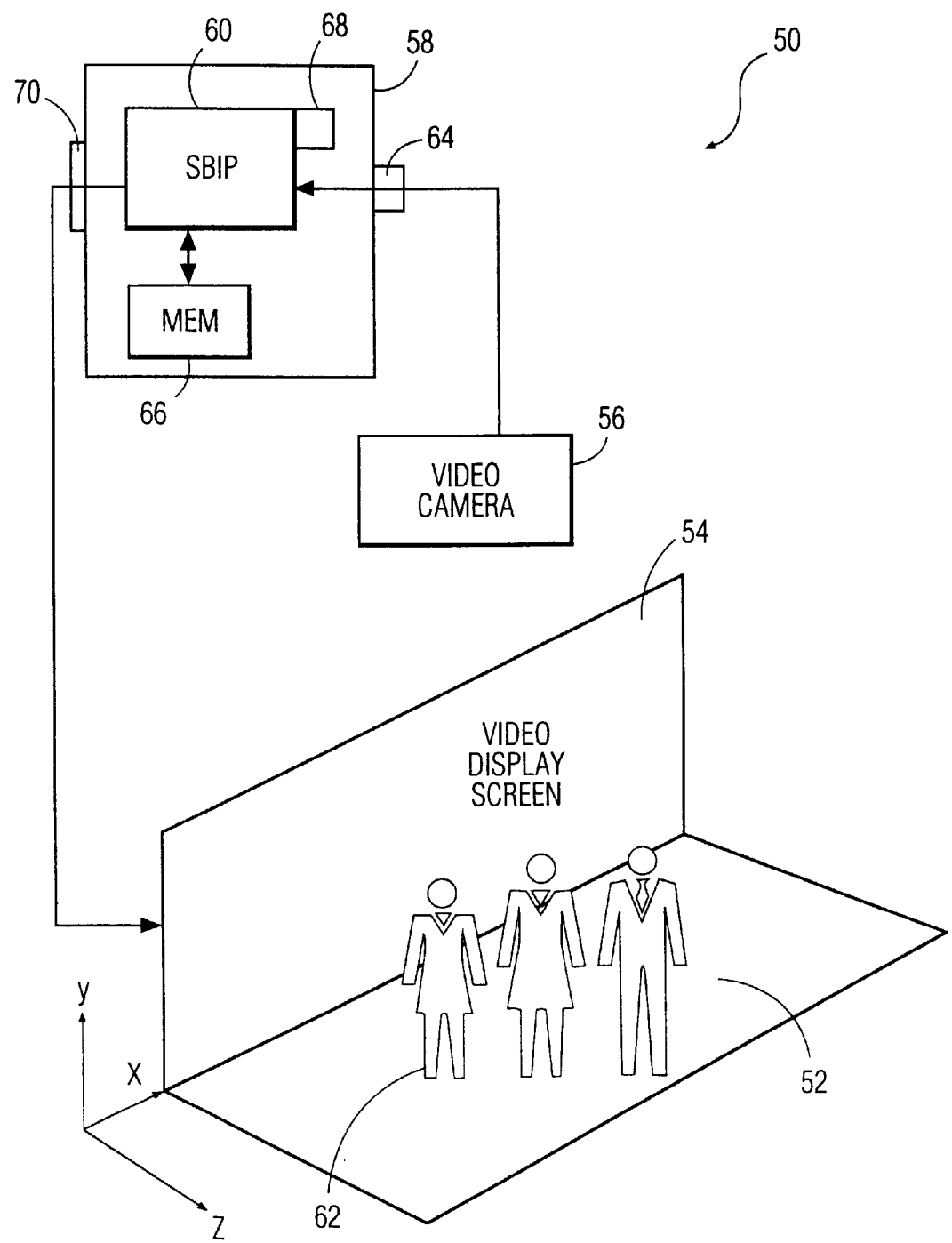
FIG. 3 is a block diagram of a system for constructing three-dimensional images using camera-based gesture inputs of users in accordance with a preferred embodiment of the present invention.

Rather than relying on conventional SGI-based software, the present invention utilizes a camera-based user interface system 50, as best shown in FIG. 3. System 50 comprises a video camera 56, a video display screen 54, and a computer 58 having a Philips® single board image processor (SBIP) 60. SBIP 60 eliminates problems (1)–(3) encountered in the approach proposed by the Media Lab at the Massachusetts Institute of Technology, and thus, also encountered in the two-dimensional systems. Computer 58 also comprises a computer-readable memory 66 encoded with three-dimensional imaging software. SBIP 60 utilizes the software so that system 50 may handle the three-dimensional body motions of the system user. The three-dimensional imaging software of the present invention corrects problems (4) and (5) encountered in the approach proposed by the Media Lab at the Massachusetts Institute of Technology.

To address problem (6) of the Media Lab approach, the present invention provides an interactive video environment ("IVE") capable of evaluating several IVE paradigms other than the "magic mirror" paradigm proposed by Massachusetts Institute of Technology. The present invention is capable of evaluating the following four IVE paradigms: (1) the display shows live video of a camera input of a remote site, and the video camera input of the system users is composited with the live video on the display (this is known as "mirror" effect, as in the MIT approach); (2) the display shows live video of the remote site, and the camera input of the users is not composited with the live video on the display (this is known as "window" effect); (3) the display shows graphical images as in virtual reality, and the camera input of the system users is composited with the graphical images on the display; and (4) the display shows graphical images, and the camera input of the system users is not composited with the graphical images on the display.

A. Detailed Description of the System Hardware of the Preferred Embodiments

As embodied herein, a system and method for constructing three-dimensional images using camera-based gesture inputs of a preferred embodiment of the present invention is shown in FIG. 3. Specifically, system 50 comprises a means for processing video signals, such as a computer 58, electrically coupled to a means for generating video signals, such as a video camera 56. Computer 58 is electrically coupled to a means for displaying video images, such as a video display screen 54. Preferably, video display screen 54 is located in front of an interaction area 52 where system users 62 stand. Video camera 56 electronically reads the images of users 62 and interactive area 52, creates video signals corresponding to these images, and provides the video signals to computer 58.

Preferably, computer 58 comprises a typical microprocessor-based computing device such as an IBM-compatible personal computer. Computer 58 further comprises a serial port 64 connected to a microprocessor 60 for receiving the video signals from video camera 56, and a conventional computer-readable memory 66 capable of being encoded with software programs. Microprocessor 60 preferably is a Philips® single board image processor (SBIP). SBIP 60 uses the software (described below), encoded in computer memory 66, for mapping the two-dimensional image features of users 62 and interactive area 52 and calculating the three-dimensional position of system users 62 within interactive area 52. SBIP 60 also preferably uses an application program permanently encoded within computer-readable memory 66, or temporarily encoded therein via an external computer-readable memory, such as for example, a floppy diskette or a CD ROM. Computer 58 further comprises a mode control port 68, connected to SBIP 60 for receiving data from other interactive controls such as a remote control, and a video processor port 70 for delivering video signals to video display screen 54. The software encoded in computer-readable memory 66, and used by SBIP 60, isolates the contours of the system users, determines their body and limb positions in three-dimensional image space, and generates a video signal corresponding to the body and limb position to video display screen 54.

Display screen 54 preferably consists of a conventional audio/visual monitor system capable of displaying three-dimensional graphical information. The type of display screen 54 and video camera 56 used in the present invention is arbitrary and may be. chosen based only upon the intended application of the system of the present invention.

In a more preferred embodiment of the system for constructing three-dimensional images using camera-based gesture inputs of the preferred embodiment, video display screen 34 is a rear-projection Ikegami TPP 1000/1500® projector with a Retroscan RS 125SW® screen (six feet in height in the y direction and eight feet in width in the x direction); interaction area 52 is an eleven feet (in the z direction) by twelve feet (in the x direction) area in front of video display screen 54; and video camera 56 is a Sony® NTSC video camera.

Figure 4:
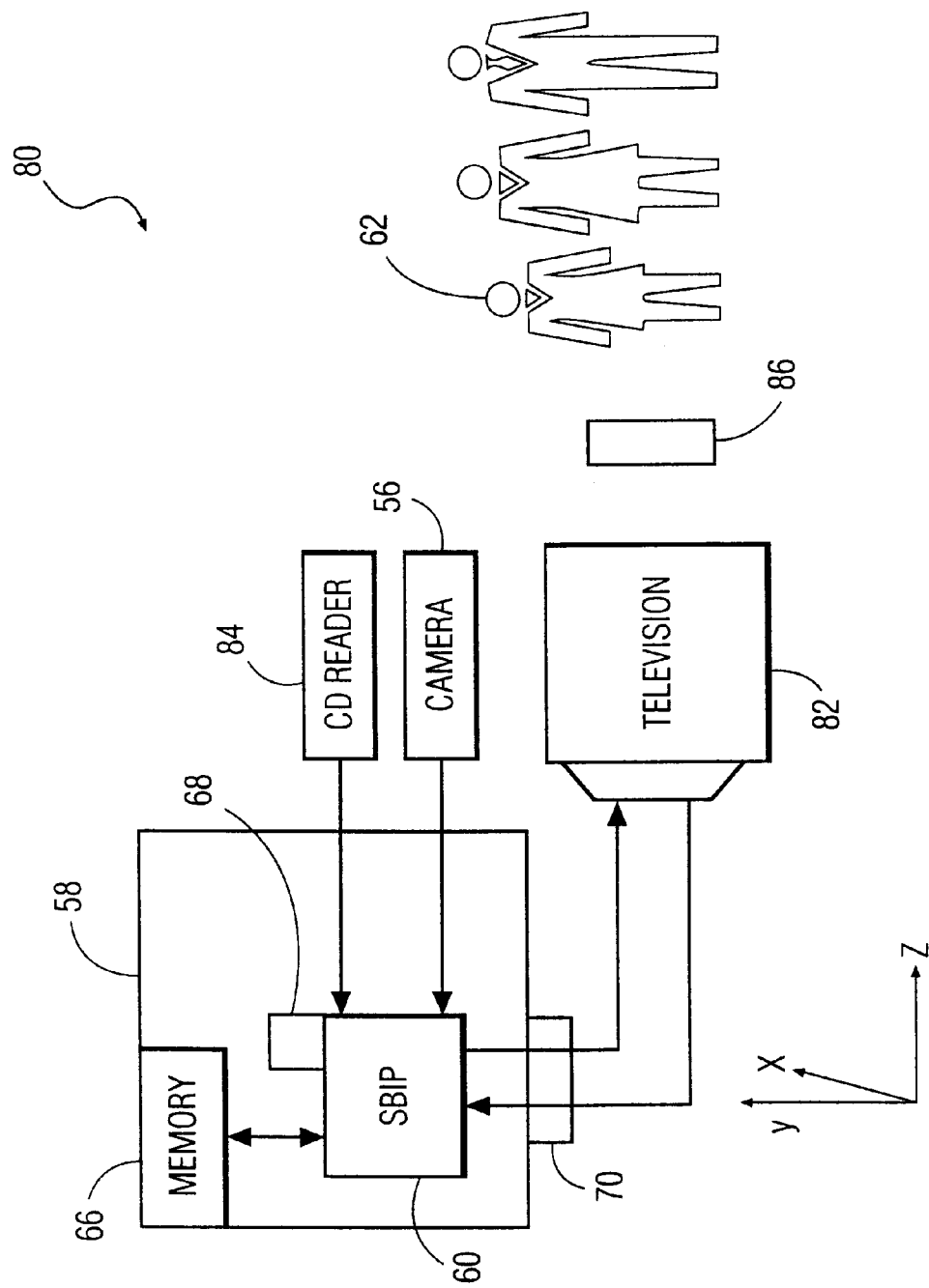
FIG. 4 is a block diagram of a system for constructing three-dimensional images using camera-based gesture inputs of users in accordance with another preferred embodiment of the present invention.

An alternate embodiment of the system and method for constructing three-dimensional images using camera-based gesture inputs in accordance with the present invention is shown in FIG. 4. As shown, the alternate embodiment 80 comprises a video camera 56 and computer 58 with SBIP 60 and computer-readable memory 66 similar to those described with reference to FIG 3. However, the alternate embodiment further comprises a compact disc reader 84 capable of reading an application program encoded on a CD ROM and providing such application program to SBIP 60. The alternate embodiment also comprises a remote controller 86 for controlling features of the application program. Furthermore, in contrast to the display screen of the embodiment shown in FIG. 3, the alternate embodiment includes a conventional television display 82 capable of receiving video signals from SBIP 60 and transmitting information to SBIP 60.

B. Description of the System Software of the Preferred Embodiments

In accordance with the preferred embodiments of the present invention, the software for mapping two-dimensional image features of system users and an interactive area onto three-dimensional locations within the interactive area, as well as the applications programs for use with the preferred embodiments, will now be described. For ease of reference, the software and applications programs are described with reference to a single system user. However, it is to be understood that the camera-based gesture recognition technology of the present invention can be used with multiple users by identifying each user individually and interacting with each user accordingly.

Figure 1:
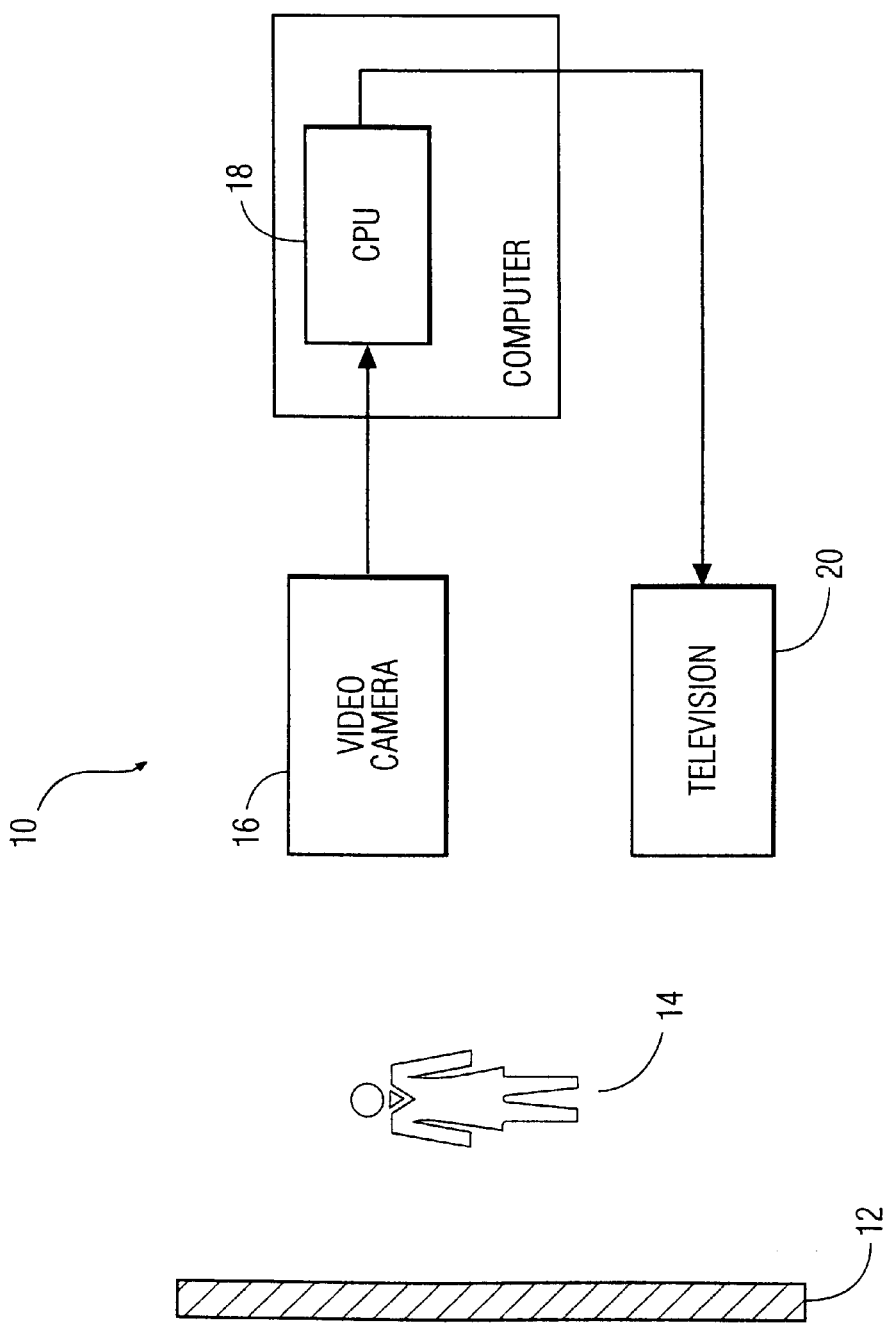
FIG. 1 is a block diagram of a conventional system for constructing two-dimensional images using camera-based silhouettes of users.
Figure 2:
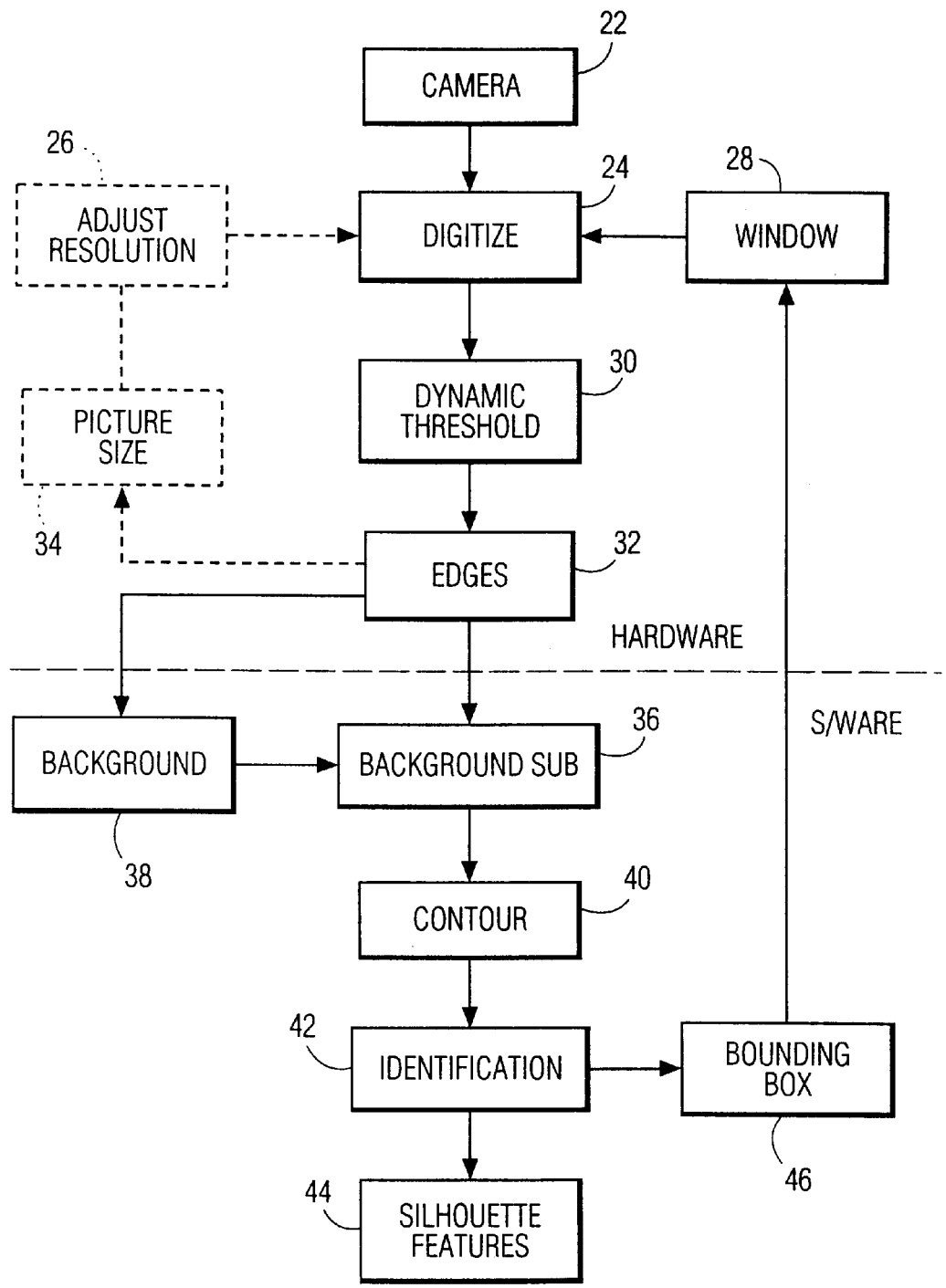
FIG. 2 is a flowchart showing the steps involved in a conventional software process for extracting two-dimensional images using silhouettes of users.
Figure 5:
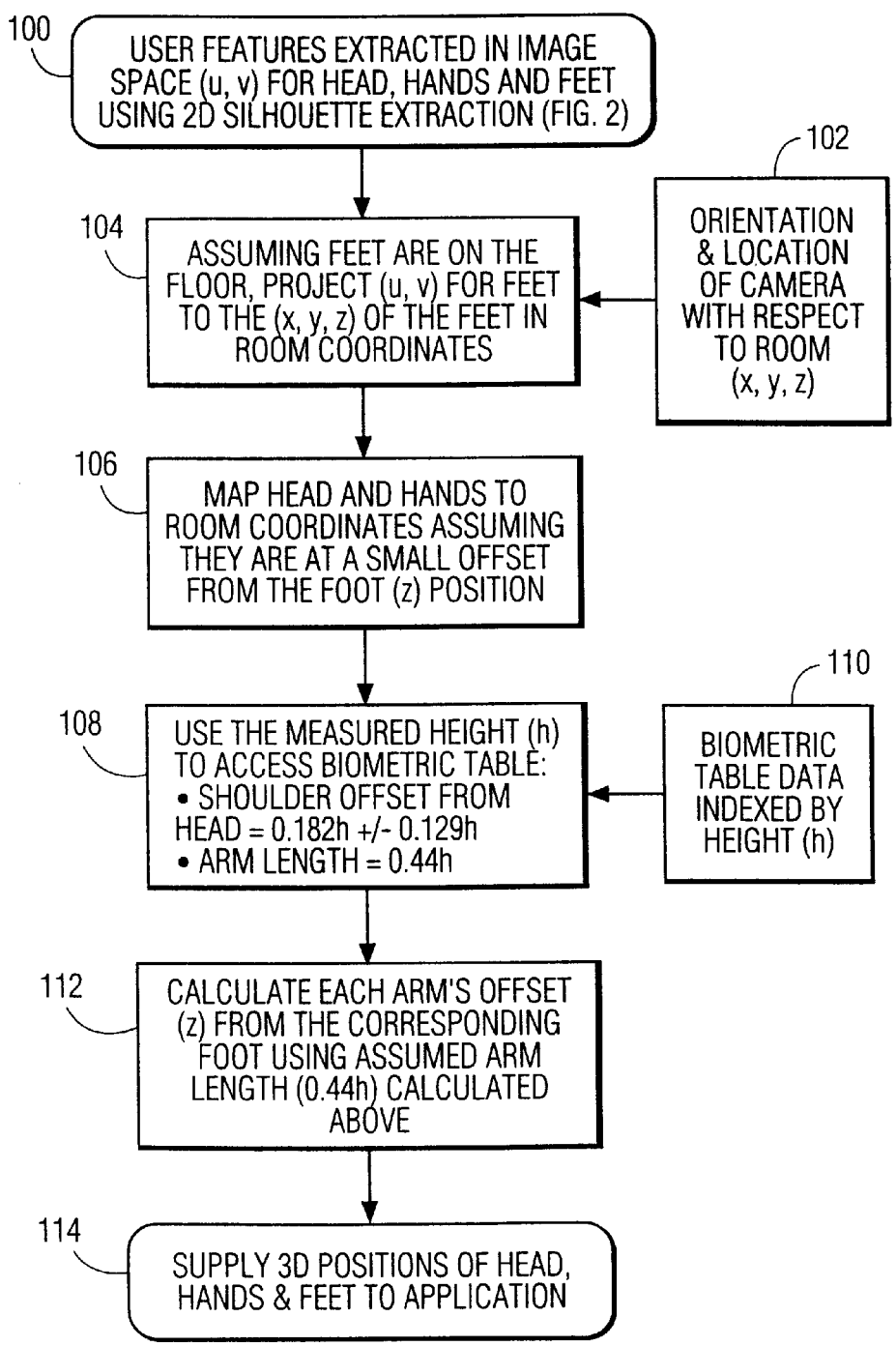
FIG. 5 is a flowchart showing the steps involved in a software process for mapping two-dimensional image features of users and an interactive area onto three-dimensional locations within the interactive area in accordance with the preferred embodiments of the present invention shown in FIGS. 3 and 4.

FIG. 5 is a flowchart showing the steps involved in the software process for mapping two-dimensional image features of a system user 62 onto three-dimensional locations the room where system user 62 is located in accordance with the preferred embodiments of the present invention shown in FIGS. 3 and 4. The three-dimensional imaging software may be permanently encoded within computer-readable memory 66 or may be temporarily encoded in memory 66 via a diskette, CD ROM, or similar memory storage means. As shown, the three-dimensional imaging software process comprises a first step 100 of extracting the two-dimensional head, hands and feet features of a user in image space coordinates (u, v) using the two-dimensional extraction process shown in FIG. 2. Coordinates (u, v) correspond to the two-dimensional x-y plane of the user in front of video camera 56. The three-dimensional imaging process further comprises a step 102 of reading the orientation and location of video camera 36 in three-dimensional coordinates (x, y, z) with respect to the room. Assuming the user's feet are on the floor, at step 104 the software process projects the two-dimensional, extracted features of the user's feet to three-dimensional coordinates (x, y, z) of the user's feet using the (x, y, z) orientation of camera 36 with respect to the room. At step 106, the software process projects the two-dimensional, extracted features of the user's head and hands to three-dimensional coordinates (x, y, z) of the user's head and hands, assuming that the head and hands are slightly offset from the position of the feet in the z direction and using the (x, y, z) orientation of camera 36 with respect to the room.

Figure 8:
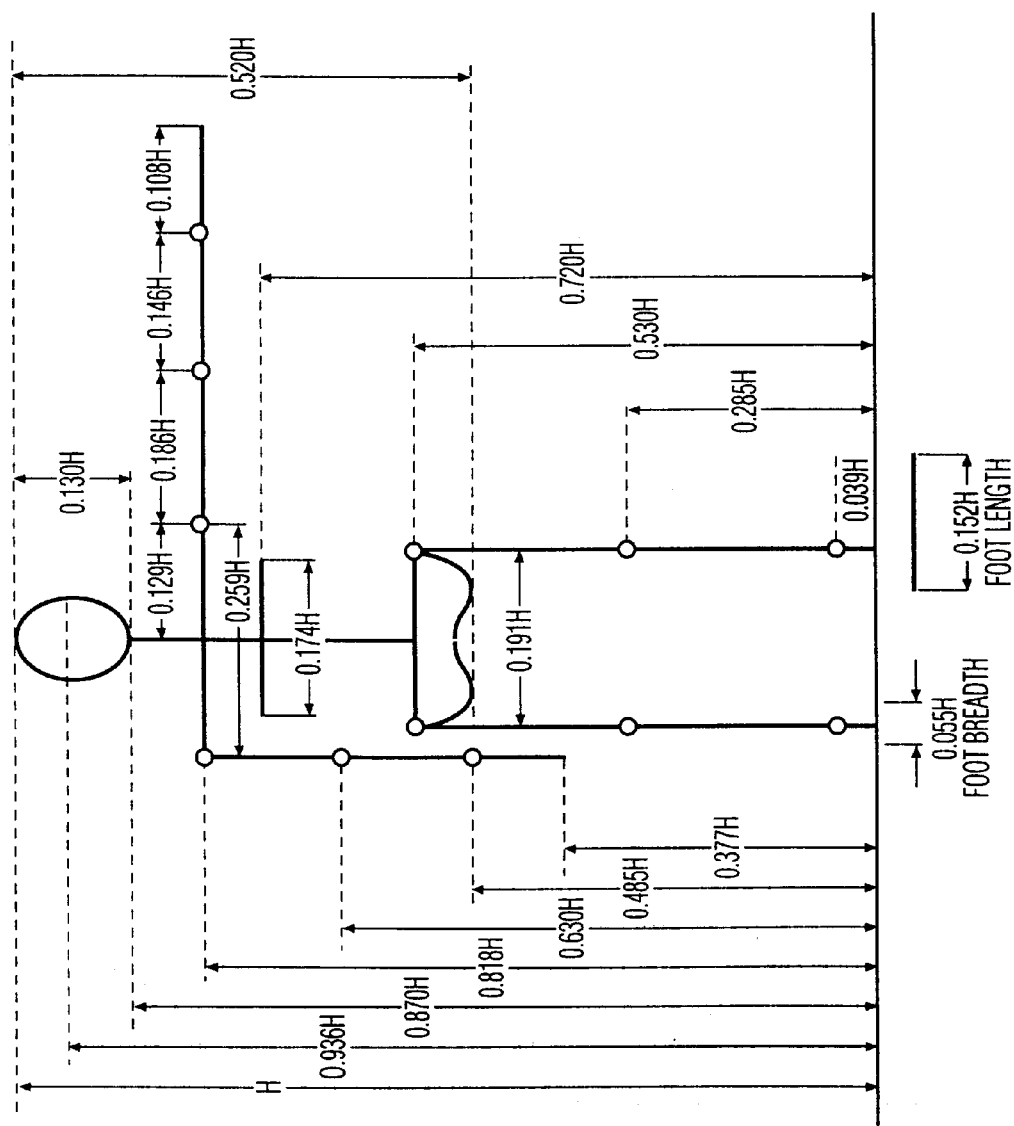
FIG. 8 is a biometric data table showing the length of body parts as a ratio of the body height (H), wherein the body height (H) is the height of a standing person.

The three-dimensional imaging process further comprises a step 108 of using the measured height (h) of the user to access a biometric data (shown at step 110) indexed by height and stored within computer-readable memory 66. An example of a biometric data table capable of use with the present invention is shown in FIG. 8. The present invention is not limited by the biometric data shown in FIG. 8, since other biometric data may be utilized as set forth in D. Chaffin & G. Andersson, *Occupational Biomechanics*, 2d ed. (1991), L. Farkas, *Anthropometry of the Head and Face*, 2d ed. (1994), and N.A.S.A., *Anthropometric Source Book*, vols. 1–3 (1978). The three-dimensional imaging process assumes that the user's shoulders are offset from the top of the user's head to the bottom of the user's neck by a distance of 0.182h in the y-direction, and that the shoulder width from the center of the user's back to the end of the shoulder blade is 0.129 h in the x direction, wherein h is the user's height. The imaging process further assumes that the user's arm length is 0.44 h, and utilizes the assumed arm length (0.44h) until a measured arm length greater than 0.44 h is extracted by video camera 56. The software process further comprises a step 112 of calculating each arm's offset in the z direction from the corresponding foot, using the assumed arm length (0.44 h) calculated in step 108. At step 112, each arm's actual length in the z direction is calculated from the assumed arm length using the principle of foreshortening. The software process comprises a final step 114 of supplying the three-dimensional positions of the user's head, hands and feet to an application program.

C. Examples of Application Programs for Use with the Preferred Embodiments

The invention will be further clarified by the following examples of application programs capable of use with the system and method for constructing three-dimensional images using camera-based inputs of the present invention. The application programs are intended to be purely exemplary of the uses of the preferred embodiments of the present invention, and are not intended to limit the scope of the broad features of the invention. The preferred embodiments of the present invention can be used with any application requiring calculation of a three-dimensional position of a user so that the user may manipulate graphical computer-generated objects in three dimensions. Examples of application programs include a three-dimensional soccer video game, a home shopping application, an information wall for multiple user interaction, a telecommunications application, a gesture-based remote control, and a home exercise application.

1. Three-Dimensional Soccer Video Game

Figure 6:
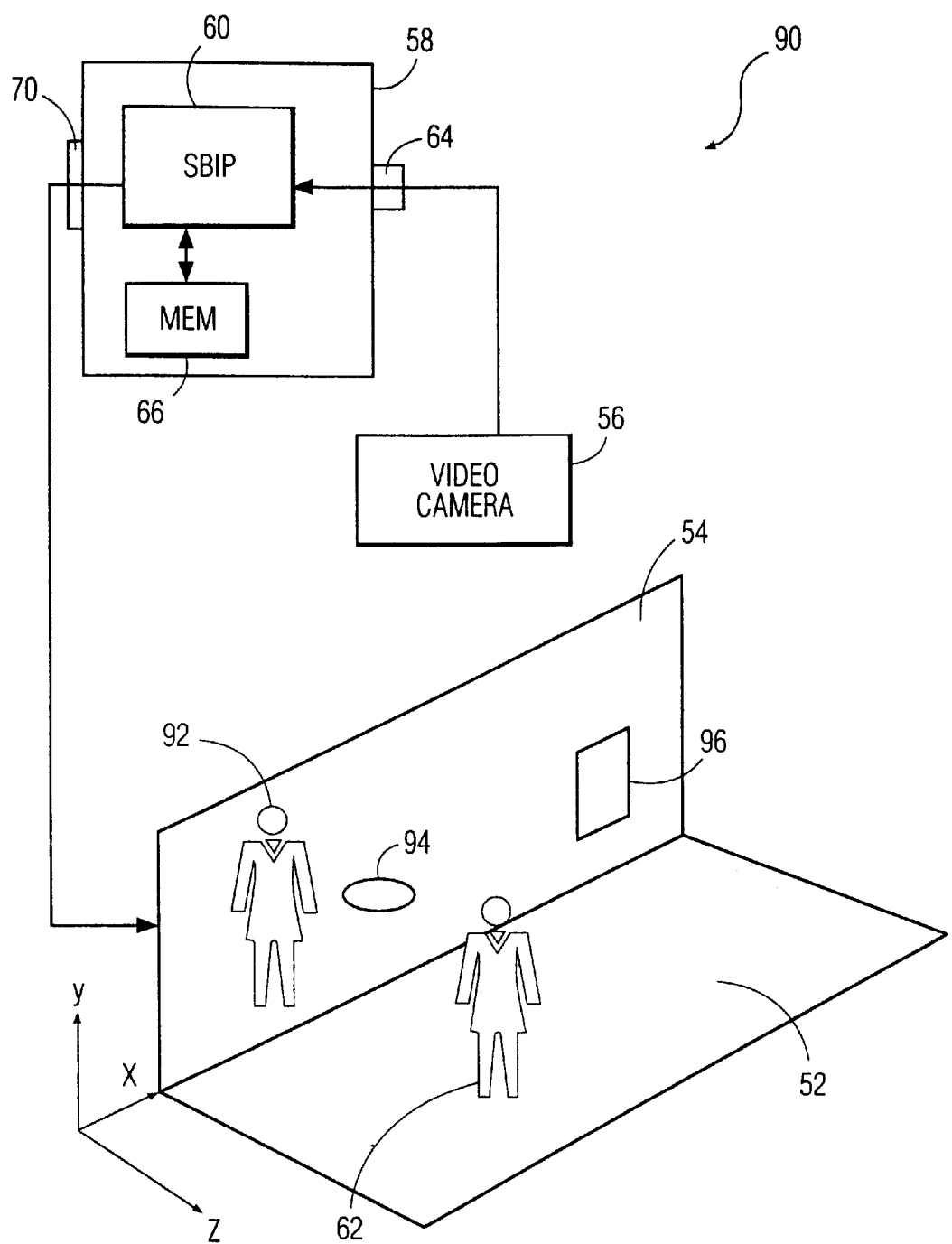
FIG. 6 is a block diagram showing the three-dimensional soccer game with the system and method for constructing three-dimensional images using camera-based gesture inputs of the preferred embodiment of the present invention shown in FIG. 3.

FIG. 6 is a block diagram showing a three-dimensional soccer (also known as "football" throughout the world) video game application using the system and method of the preferred embodiment shown in FIG. 3. A user 62 of the soccer game stands in front of video display screen 54 on which a graphical image of the virtual soccer game is displayed. Video camera 56 views user 62 and SBIP 60 processes data received from camera 56 by extracting the image of user 62 and by identifying the user body motions, such as the three-dimensional positions of the user's head, hands, legs, feet, etc., as described above.

Video display screen 54 displays the camera image of user 92 and interaction area 52, and also displays a graphical overlay of a soccer field with interaction area 52. Screen 54 displays a graphical image of a goal area 96 on the floor towards one side of interaction area 52, and displays a graphical image of a soccer ball 94 on the floor in the middle of interaction area 52. Goal area 96 and soccer ball 94 are preferably displayed in a scaled and rotated fashion so as to appear as if they were on the floor.

When the user approaches a part of interaction area 52 where the graphical soccer ball 94 resides, the user can seemingly "kick" soccer ball 94. The system of the present invention does not actually respond to the "kick". Rather, the system responds to the direction from which the user approaches soccer ball 94 and to the closeness of the user to soccer ball 94. Soccer ball 94 moves with a velocity dependent upon the direction and speed with which the user approached the "kicked" soccer ball 94. This simulates a "kicking" effect by the user. Whenever soccer ball 94 hits one of the sides of interaction area 52, e.g., the front of display screen 54, a simulated back wall, or two side panels of display screen 54, soccer ball 94 "bounces" back into the playing area. The object of the virtual soccer game is to get soccer ball 94 into goal area 96.

Figure 7:
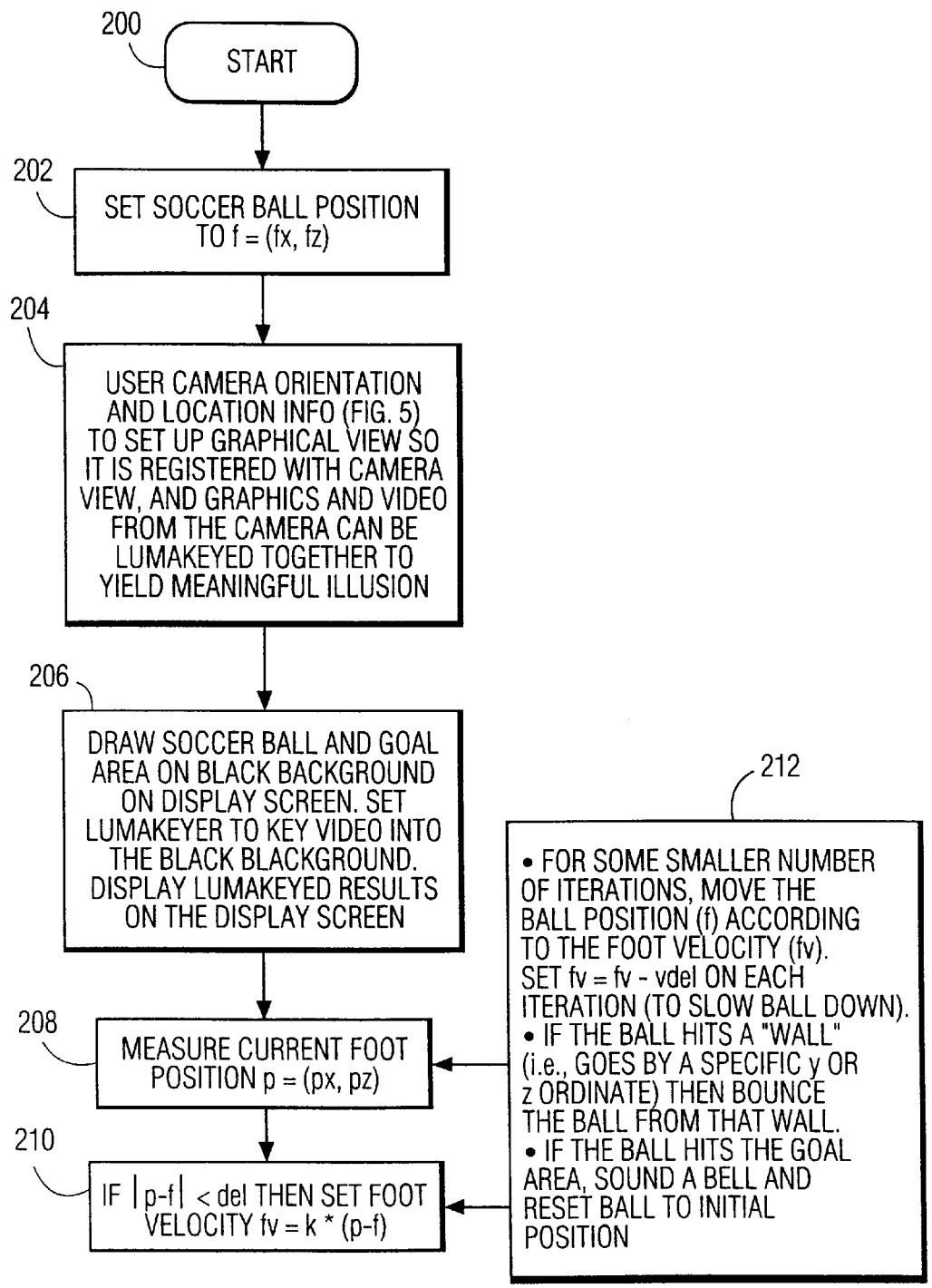
FIG. 7 is a flowchart showing the steps involved in an application program for a threedimensional soccer game using the system and method for constructing three-dimensional images using camera-based gesture inputs of the preferred embodiment of the present invention shown in FIG. 6.

FIG. 7 is a flowchart showing the steps involved in an application program for a three-dimensional soccer game using the system and method for constructing three-dimensional images using camera-based gesture inputs of the preferred embodiment of the present invention shown in FIG. 3. With reference to FIG. 7, the virtual soccer game application program starts at step 200 and comprises a step 202 of setting the soccer ball position (f) in x and z coordinates, as (fx, fz). At step 204, the video camera 56 orientation with respect to the user is determined and the location of the user is read in from the extracted, three-dimensional image data extracted by the three-dimensional imaging process of FIG. 5. Step 204 further comprises setting up the graphical view of the soccer game (i.e., goal area 96 and soccer ball 94) so it is registered with the camera view, and lumakeying (method of mixing two video streams known in the art) the graphics and video from camera 56 together to yield a meaningful illusion for the user. The virtual soccer game application program further comprises a step 206 of drawing soccer ball 94 and goal area 96 onto the black background of display screen 54, setting the lumakeyer to key the video obtained at step 204 into the black background of display screen 54, and displaying the lumakeyed results onto display screen 54.

The virtual soccer game application program also comprises a step 208 of measuring the user's current foot position (p), in x and z coordinates, as (px, pz). At step 210, if the absolute value of the difference between current foot position (p) and soccer ball position (f), i.e., |p−f|, is less than a predetermined variable (del), then the user's foot velocity (fv) is set equal to k*(p−f). The value "k" is a scaling factor like a spring constant and through experimentation is preferable 1.1. The value "del" represents the foot position from the soccer ball, and through experimentation preferably is five (5) inches. The virtual soccer game application program further comprises a step 212 of moving the ball position (f) according to the foot velocity (fv) for a predetermined number of iterations, e.g., twenty (20) iterations. At step 212, the foot velocity (fv) is decreased by a predetermined variable (vdel) on each iteration so to slow soccer ball 94 down. The value "vdel" is chosen to decrease foot velocity (fv) by ten percent each iteration. All of the predetermined values (k, del, vdel, iterations) are set to ensure that the soccer ball moves as if it were a real soccer ball. Further, at step 212, if soccer ball 94 hits a "wall", i.e., goes by a predetermined y or z coordinate deemed to be a wall, then soccer ball 94 is bounced from that "wall". Finally, at step 212, if soccer ball 94 enters the space determined to be goal area 96, a bell is sounded and soccer ball 94 is reset to its initial position.

2. Home Shopping Application

A home shopping application program may also be used with the preferred embodiment of the present invention shown in FIG. 4. The home shopping application utilizes the same concepts discussed above with reference to the three-dimensional soccer video game, but instead of a soccer ball being moved based upon user gestures, clothing is moved as the user tries them on.

One reason why home shopping through a television or computer catalog is uncommon is that consumers find it difficult to determine what the product will look like when they wear it. The preferred embodiment of the present invention can address this problem when used with the home shopping application. The home shopping application offers products (such as shirts, shoes, pants, dresses, hats, etc.) for sale through either a television broadcast or a CD ROM catalog. With the home shopping application, the user stands in front of their television and sees his/herself on the television wearing a selected product. As the user moves and turns, the preferred embodiment of the present invention determines the body motions and transforms the computer-generated graphical image of the product accordingly. Automatic size generation of a product is also possible with the home shopping application.

3. Information Wall for Multiple User Interaction

An information wall application program may also use the system and method of the preferred embodiment shown in FIG. 3. The information wall comprises a large, notice board-like display screen that multiple users can interact with, providing a highly intuitive and interactive information system. Such an application is preferably deployed in shopping malls, museums, libraries, galleries, and other similar environments.

For example, in a shopping mall the information wall would allow shoppers entering the mall to simply stand within a certain distance of the wall to activate it. The information wall then displays an overall map of the mall at the position and height of the person standing in front of it. A number of information icons are displayed around the map from which the shopper can select by pointing. By pointing at the icons, the information wall displays various pieces of information, such as, the location of certain stores and rest-rooms, and so forth. The information wall may also support forms of advertising. For example, by pointing at a store on the map, the shopper could display a short video sequence describing the products and service offered by the store. The information wall may also permit the display to follow the user as he/she walks along its length, pointing in the correct direction to enable a shopper to get where he/she wants to go.

4. Telecommunications Applications

The preferred embodiments of the present invention may also be used with telecommunications applications. Currently, bandwidth problems prevent consumer telecommunications via video. With the present invention, users can communicate via a shared virtual reality world, rather than via their actual environments. Only video from the user silhouette needs to be transmitted and shown in the virtual environment, wherein the preferred embodiments of the present invention extracts the user silhouette. This approach could be simplified even more by showing the users with computer-generated bodies (in the correct position and pose, since the present invention can determine that) and only video of the head region is transmitted.

Multi-user video conferencing may also be aided by the present invention. Currently, a user needs to pan and zoom the camera from user to user of a teleconference. The present invention could be used as part of a commercial teleconferencing system where the camera can be controlled by the gestures of the participants in the teleconference. For example, pointing at a participant causes the camera to focus on that participant, raising your hand attracts the camera to focus on you, etc.

5. Gesture-Based Remote Control

The preferred embodiments of the present invention could also be used as part of the infrastructure of an integrated home entertainment and communications system, replacing the functions currently provided by a remote control unit. For example, the user's position within the room, as well as user body pose and gestures, could all be accessed by the present invention. Pointing at a CD player could display the controls for the CD player on the television, and pointing at menu items on the television could select those items.

If more than one television (or display) is in the room, the position of the user could be used to determine which television is employed. If there are more than one user, it is also conceivable that the present invention could enable separate commands issued by different users, or construct a hierarchy of authority for the different commands.

Additionally, a conventional remote control could be used with the present invention, wherein the present invention simplifies the functionality of the remote control, e.g., so that it has only four buttons. With the present invention, a user could point the remote control at the CD player (or stand adjacent thereto), and the remote control would function as a CD player remote. Alternatively, the user could sit in front of the television and the remote control would function as a channel changer. Finally, the remote control could be used to establish a hierarchy of authority wherein the preferred embodiments of the present invention will respond only to the user holding remote control.

6. Home Exercise Application

The preferred embodiments of the present invention could also be used to support home exercise CD ROM programs, wherein the user buys his/her own celebrity trainer. The present invention provides information on the location of the user in a room to the home exercise program so that the trainer will always look in the direction of the user. The present invention can also determine when the user stops exercising in the middle of an exercise, so that the trainer can recommend an alternate exercise regimen. It is also possible for the trainer to critique the way a user is exercising and offer helpful information.

An additional feature of the home exercise application would be to combine video input of the user with the graphically-generated image of the trainer and display both on a television (similar to the way clothing is displayed on users in the home shopping application). Such a feature gives the user the advantage of seeing themselves in action, and permits the trainer to point or touch portions of the video image of the user so to impart advice, e.g., lift your leg this high.

It will be apparent to those skilled in the art that various modifications and variations can be made in the system and method for constructing three-dimensional images using camera-based gesture inputs of the present invention and in construction of this system without departing from the scope or spirit of the invention. As an example, the system and method could be used with other application programs which require three-dimensional construction of images and users, and require interaction between the users and three-dimensional images. Further, CD reader 84 and remote 86 of the system shown in FIG. 4 may be used with the system shown in FIG. 3. Finally, audio features may be incorporated into the preferred embodiments to provide voice-recognized commands from the system user and sound effects to the display screen.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for constructing three-dimensional images using camera-based gesture inputs of a user of the system, comprising:

a computer-readable memory means;

means for receiving video signals indicative of the gestures of the system user and an interaction area surrounding the system user;

means for displaying video images, the video image display means being positioned in front of the system user; and means for processing the video signals, in accordance with a program stored in the computer-readable memory means, to determine the three-dimensional positions of the body and principle body parts of the system user, wherein the video signal processing means constructs three-dimensional images of the system user and interaction area on the video image display means based upon the received video signals, the video image display means displays three-dimensional graphical objects superimposed to appear as if they occupy the interaction area, and movement by the system user causes apparent movement of the superimposed, threedimensional objects displayed on the video image display means.

2. A system for constructing three-dimensional images using camera-based gesture inputs of a user as recited in claim 1, wherein the superimposed, three-dimensional objects appear to move as if they were physical objects moving in the interaction area.

3. A system for constructing three-dimensional images using camera-based gesture inputs of a user as recited in claim 1, wherein the video signal processing means constructs the three-dimensional images of the system user by: projecting two-dimensional positions (u, v) of the feet of the system user to three-dimensional coordinates (x, y, z) of the feet; mapping the head and hands of the system user to three-dimensional coordinates assuming the head and hands are offset from a z position of the feet; using a height (h) of the system user with biometric data to calculate the shoulder offset of the system user from the head, and to calculate the arm length of the system user; calculating the offset of each arm of the system user from a corresponding foot of the system user; and supplying the calculated three-dimensional positions of the head, hands and feet of the system user to the video image display means.

4. A system for constructing three-dimensional images using camera-based gesture inputs of a user as recited in claim 3, wherein the superimposed, three-dimensional graphical objects comprise:
a soccer ball having a set position (f); and
a goal area having a set position on video image display means, wherein video signal processing means compares the foot position (p) of the system user with the set position (f) of the soccer ball so to calculate the foot velocity (fv) of the system user, moves the soccer ball according to the calculated foot velocity (fv), slows the soccer ball down by a predetermined velocity, and sounds a bell if the soccer ball enters the goal area.

5. A system for constructing three-dimensional images using camera-based gesture inputs of a user as recited in claim 1, wherein the three-dimensional graphical objects comprise:
a soccer ball having a set position (f); and
a goal area having a set position on video image display means, wherein video signal processing means compares a foot position (p) of the system user with the set position (f) of the soccer ball so to calculate the foot velocity (fv) of the system user, moves the soccer ball according to the calculated foot velocity (fv), slows the soccer ball down by a predetermined velocity, and sounds a bell if the soccer ball enters the goal area.

6. A method for constructing three-dimensional images using camera-based gesture inputs of a user of a computer system having a computer-readable memory and video image display connected to a microprocessor using a program stored in the computer-readable memory, the method comprising the steps of:
receiving video signals indicative of the gestures of the system user and an interaction area surrounding the system user;
processing the video signals in the microprocessor to determine the three-dimensional positions of the body and principle body parts of the system user;
using the microprocessor to construct three-dimensional images of the system user and interaction area on the video image display based upon the received video signals; and
utilizing the microprocessor to display on the video image display three-dimensional graphical objects superimposed to appear as if they occupied the interaction area, wherein movement by the system user causes apparent movement by the superimposed, three-dimensional objects displayed on the video image display.

7. A method for constructing three-dimensional images using camera-based gesture inputs of a user of a computer system, as recited in claim 6, wherein the superimposed, three-dimensional objects appear to move as if they were physical objects.

8. A method for constructing three-dimensional images using camera-based gesture inputs of a user of a computer system, as recited in claim 6, wherein the three-dimensional image construction step comprises the steps of:
projecting two-dimensional positions (u, v) of the feet of the system user to three-dimensional coordinates (x, y, z) of the feet;
mapping the head and hands of the system user to three-dimensional coordinates assuming the head and hands are offset from a z position of the feet;
using a height (h) of the system user with biometric data to calculate the shoulder offset of the system user from the head, and to calculate the arm length of the system user;
calculating the offset of each arm of the system user from a corresponding foot of the system user; and
supplying the calculated three-dimensional positions of the head, hands and feet of the system user to the video image display.

9. A method for constructing three-dimensional images using camera-based gesture inputs of a user of a computer system, as recited in claim 8, wherein the superimposed, three-dimensional graphical objects comprise a soccer ball having a set position (f), and a goal area having a set position on video image display means, the method further comprising the steps of:
comparing a foot position (p) of the system user with the set position (f) of the soccer ball so to calculate the foot velocity (fv) of the system user;
moving the soccer ball according to the calculated foot velocity (fv);
slowing the soccer ball down by a predetermined velocity; and
sounding a bell if the soccer ball enters the goal area.

10. A method for constructing three-dimensional images using camera-based gesture inputs of a user of a computer system, as recited in claim 6, wherein the three-dimensional graphical objects comprise a soccer ball having a set position (f), and a goal area having a set position on the video image display, the method further comprising the steps of:
comparing a foot position (p) of the system user with the set position (f) of the soccer ball so to calculate the foot velocity (fv) of the system user;
moving the soccer ball according to the calculated foot velocity (fv);
slowing the soccer ball down by a predetermined velocity; and
sounding a bell if the soccer ball enters the goal area.

11. A computer-readable memory device for storing a program that constructs three-dimensional images using camera-based gesture inputs of a user of a computer system having a video image display connected to a microprocessor using instructions stored in the computer-readable memory device, the computer-readable memory device comprising:

instructions for receiving video signals indicative of gestures of the system user to determine the three-dimensional positions of the body and principle body parts of the system user;

instructions for constructing three-dimensional images of the system user and interaction area on the video image display based upon the received video signals; and instructions for displaying, on the video image display, three-dimensional graphical objects superimposed to appear as if they occupied the interaction area, wherein movement by the system user causes apparent movement by the superimposed, three-dimensional objects displayed on the video image display.

12. A computer-readable memory device for storing a program that constructs three-dimensional images using camera-based gesture inputs of a user, as recited in claim 11, wherein the superimposed, three-dimensional objects appear to move as if they were physical objects.

13. A computer-readable memory device for storing a program that constructs three-dimensional images using camera-based gesture inputs of a user, as recited in claim 11, wherein the instructions for constructing the three-dimensional image comprise:

instructions for projecting two-dimensional positions (u, v) of the feet of the system user to three-dimensional coordinates (x, y, z) of the feet;

instructions for mapping the head and hands of the system user to three-dimensional coordinates assuming the head and hands are offset from a z position of the feet;

instructions for using a height (h) of the system user with biometric data to calculate the shoulder offset of the system user from the head, and to calculate the arm length of the system user;

instructions for calculating the offset of each arm of the system user from a corresponding foot of the system user; and instructions for supplying the calculated three-dimensional positions of the head, hands and feet of the system user to the video image display.

14. A computer-readable memory device for storing a program that constructs three-dimensional images using camera-based gesture inputs of a user, as recited in claim 13, wherein the three-dimensional graphical objects comprise a soccer ball having a set position (f), and a goal area having a set position on the video image display, the computer-readable memory device further comprising:

instructions for comparing a foot position (p) of the system user with the set position (f) of the soccer ball so to calculate the foot velocity (fv) of the system user;

instructions for moving the soccer ball according to the calculated foot velocity (fv);

instructions for slowing the soccer ball down by a predetermined velocity; and instructions for sounding a bell if the soccer ball enters the goal area.

15. A computer-readable memory device for storing a program that constructs three-dimensional images using camera-based gesture inputs of a user, as recited in claim 11, wherein the three-dimensional graphical objects comprise a soccer ball having a set position (f), and a goal area having a set position on the video image display, the computer-readable memory device further comprising:

instructions for comparing a foot position (p) of the system user with the set position (f) of the soccer ball so to calculate the foot velocity (fv) of the system user;

instructions for moving the soccer ball according to the calculated foot velocity (fv);

instructions for slowing the soccer ball down by a predetermined velocity; and instructions for sounding a bell if the soccer ball enters the goal area.

16. A computer program product for constructing three-dimensional images using camera-based gesture inputs of a user of a computer system having a video image display connected to a microprocessor, the computer program product comprising:

means for receiving video signals indicative of gestures of the system user to determine the three-dimensional positions of the body and principle body parts of the system user;

means for constructing three-dimensional images of the system user and interaction area on the video image display based upon the received video signals; and means for displaying, on the video image display, three-dimensional graphical objects superimposed to appear as if they occupied the interaction area, wherein movement by the system user causes apparent movement by the superimposed, three-dimensional objects displayed on the video image display.

17. A computer program product for constructing three-dimensional images using camera-based gesture inputs of a user of a computer system, as recited in claim 16, wherein the superimposed, three-dimensional objects appear to move as if they were physical objects.

18. A computer program product for constructing three-dimensional images using camera-based gesture inputs of a user of a computer system, as recited in claim 16, wherein the means for constructing the three-dimensional image comprises:

means for projecting two-dimensional positions (u, v) of the feet of the system user to three-dimensional coordinates (x, y, z) of the feet;

means for mapping the head and hands of the system user to three-dimensional coordinates assuming the head and hands are offset from a z position of the feet;

means for using a height (h) of the system user with biometric data to calculate the shoulder offset of the system user from the head, and to calculate the arm length of the system user;

means for calculating the offset of each arm of the system user from a corresponding foot of the system user; and means for supplying the calculated three-dimensional positions of the head, hands and feet of the system user to the video image display.

19. A computer program product for constructing three-dimensional images using camera-based gesture inputs of a user of a computer system, as recited in claim 18, wherein the three-dimensional graphical objects comprise a soccer ball having a set position (f), and a goal area having a set position on the video image display, the computer program product further comprising:

means for comparing a foot position (p) of the system user with the set position (f) of the soccer ball so to calculate the foot velocity (fv) of the system user;

means for moving the soccer ball according to the calculated foot velocity (fv);

means for slowing the soccer ball down by a predetermined velocity; and means for sounding a bell if the soccer ball enters the goal area.

20. A computer program product for constructing three-dimensional images using carmera-based gesture inputs of a user of a computer system, as recited in claim 16, wherein the three-dimensional graphical objects comprise a soccer ball having a set position (f), and a goal area having a set position on the video image display, the computer program product further comprising:

means for comparing a foot position (p) of the system user with the set position (f) of the soccer ball so to calculate the foot velocity (fv) of the system user;

means for moving the soccer ball according to the calculated foot velocity (fv);

means for slowing the soccer ball down by a predetermined velocity; and means for sounding a bell if the soccer ball enters the goal area.

\* \* \* \* \*

UNITED STATES PATENT AND TRADEMARK OFFICE
CERTIFICATE OF CORRECTION

PATENT NO. : 6,195,104 B1
DATED : February 27, 2001
INVENTOR(S) : Damian M. Lyons It is certified that error appears in the above-identified patent and that said Letters Patent is hereby corrected as shown below:

Title page,
Please amend the title to read as follows, -- SYSTEM AND METHOD FOR CONSTRUCTING THREE-DIMENSIONAL IMAGES USING CAMERA-BASED GESTURE INPUTS --

Signed and Sealed this

Eleventh Day of December, 2001

*Attest:*

*Attesting Officer*

NICHOLAS P. GODICI
*Acting Director of the United States Patent and Trademark Office*